Aug. 31, 1954 A. J. GERE 2,688,119

PRINTED CIRCUIT NETWORK SYSTEM

Filed April 20, 1953 3 Sheets-Sheet 1

INVENTOR.
ANSEL J. GERE
BY Rines and Rines
ATTORNEYS

Aug. 31, 1954 A. J. GERE 2,688,119

PRINTED CIRCUIT NETWORK SYSTEM

Filed April 20, 1953

3 Sheets-Sheet 2

INVENTOR.
ANSEL J. GERE
BY Rines and Rines
ATTORNEYS

Aug. 31, 1954 A. J. GERE 2,688,119

PRINTED CIRCUIT NETWORK SYSTEM

Filed April 20, 1953 3 Sheets-Sheet 3

INVENTOR.
ANSEL J GERE
BY Rines and Rines
ATTORNEYS

Patented Aug. 31, 1954 2,688,119

UNITED STATES PATENT OFFICE 2,688,119

PRINTED CIRCUIT NETWORK SYSTEM

Ansel J. Gere, Norwood, Mass., assignor to The Gabriel Company, Cleveland, Ohio, a corporation of Ohio Application April 20, 1953, Serial No. 349,927

9 Claims. (Cl. 333—5)

The present invention relates to electric networks and systems and more particularly to networks of the printed-circuit type adapted to prevent interference and other mutual effects between two different-frequencied signals fed to or from a common system.

Various types of filters and other devices have been proposed for permitting multi-frequencied signals to pass to or from a common point without appreciable interference or mutual effects between the paths along which the individual signals are propagated. Such devices, for example, are utilized to permit the simultaneous transmission of audio and video signals, or to permit the distribution of low- and high-frequencied signals respectively emanating from low-and-high-frequency signal sources. One application for such devices in the field of television, as a further illustration, resides in the feeding of the high and low television radio-frequency signals along a common transmission line to a receiver from separate antennas particularly tuned respectively for the high and low frequencies.

Among the different types of devices proposed for use in these systems are resonant or anti-resonant filters comprising arrangements of coils and condensers that are tuned to resonant at or to be anti-resonant to a particular limited frequency band, and filters comprising transmission-line sections that are similarly adapted to be so resonant or anti-resonant. As an illustration, a common transmission line may be connected to two sources of different-frequencied signals through capacitance and inductance elements, respectively. The inductance elements may present a high impedance to the energy fed through the capacitance elements from one of the signal sources, while the capacitance elements present a high impedance to the energy fed from the other signal source. The energy is thus fed from the two sources to the common transmission line without appreciable interference or mutual effects between the different-frequencied-signal feed systems. As another illustration, series- or shunt-arranged coils and condensers, tuned or made resonant or anti-resonant to particular bands of frequencies, have been inserted in the feed paths from the common transmission line to the separate sources of different-frequencied signals. The signal energy fed from one source will then not pass into the feed system from the other source of signals, and vice versa. In all such cases, the object is the same, namely, to avoid the impedance mismatching introduced between a signal source and the common transmission line by virtue of the passage of the signal from that signal source into the feed system from the other different-frequencied signal source, and to avoid the losses inherent in the absorption of power by such passage. In order to utilize these filter systems with transmission lines of relatively high impedance, say of the order of 300 ohms, moreover, the inductance elements in the tuned resonant or anti-resonant circuits must have large values and thus substantial physical size. Such inductances, however, have been found to introduce various spurious resonances and other disadvantageous effects into the operation of the filter, particularly at the higher frequencies. In addition, such tuned filter devices have the decided limitation that they are useful only with particular-frequencied signal sources of limited narrow frequency bands only.

An object of the present invention is to provide a new and improved interaction-free multi-frequency signal system that shall not be subject to any of the above-mentioned disadvantages, and that, on the contrary, is of broad utility with any of an infinite number of lower and higher radio-frequency bands.

A further object is to provide a new and improved printed circuit network that is particularly adapted for such systems.

An additional object is to provide novel printed circuit elements suitable for use in such networks.

Still a further object is to provide new and improved printed-circuit band-pass constant K-type networks. From the broad point of view, the present invention utilizes a pair of untuned, non-resonant constant K-band-pass networks having particular dimensional restrictions, preferably of the printed-circuit type, and one of which is adjusted to pass substantially all frequencies below a predetermined frequency with substantially uniform negligible attenuation, and the other of which is adjusted to pass with substantially uniform negligible attenuation a very wide range of frequencies above the said predetermined frequency. The upper limit of the wide range of frequencies theoretically extends to infinity, but actually the highest frequencies are limited by the dimensions of the circuit elements which become appreciable portions of the wavelength of such highest frequencies.

Other and further objects will be explained hereinafter and will be more particularly pointed out in the appended claims.

The invention will now be described in connection with the accompanying drawings, Fig. 1 of which is a block diagram illustrating a preferred utilization of the network system of the present invention;

Figure 2:
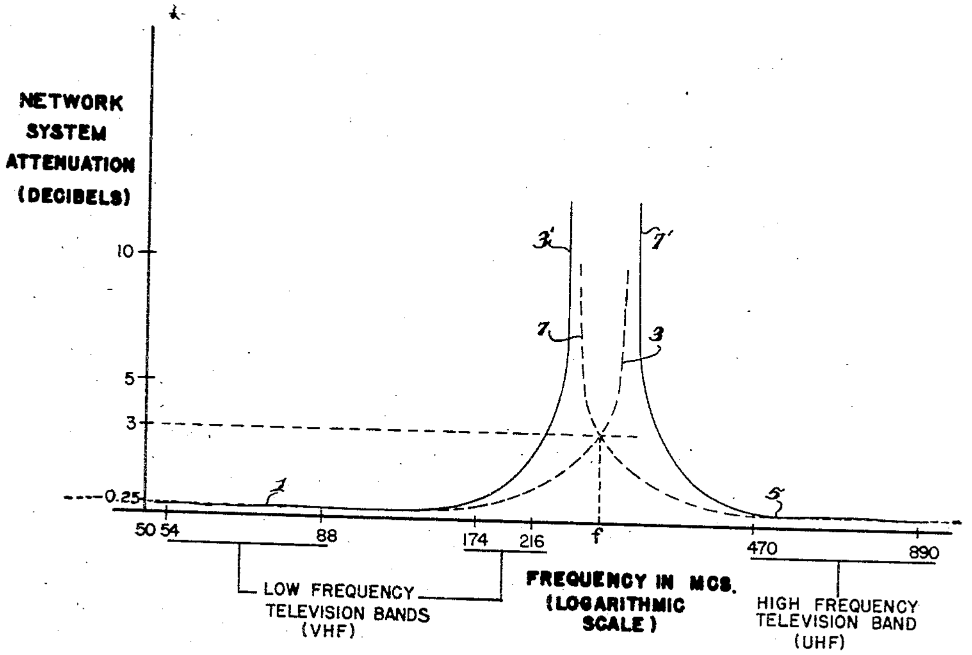
Fig. 2 is a graph illustrating the performance of such a network.

Referring first to the graph of Fig. 2, along the ordinate is plotted the attenuation or loss of energy in the network system, expressed in units of decibels, as a function of the frequency applied to the network system, expressed in units of megacycles and plotted upon a logarithmic scale along the abscissa. Starting with a frequency of about fifty megacycles and a negligible attenuation of the order of about a quarter of a decibel, the dash-line curve 1 continues substantially horizontally until it approaches the neighborhood of a predetermined frequency $f$. In actual practice, the curve 1 extends to the left, with the same negligible attenuation down to zero frequency. In the neighborhood of the predetermined frequency $f$, the curve rises slowly, reaching about three decibels of attenuation at the frequency $f$. From this response curve, it will be evident that all frequencies below the frequency $f$, are passed by the network with negligible substantially uniform or constant attenuation. Signals, for example, within the low-frequency television band, commonly known as the V. H. F. band, extending from about 54 to 88 and 174 to 216 megacycles, will be passed by a network having such a band-pass response with minimal attenuation or loss. Any frequency band, moreover, may similarly pass through such a network provided only that it lies to the left of the predetermined frequency $f$. To the right of this predetermined frequency $f$, as shown by the steep rapidly rising portion 3 of the dash-line curve 1, the attenuation rapidly increases. Frequencies above the predetermined frequency $f$, therefore, insofar as the response curve 1—3 is concerned, are greatly attenuated or cut-off, and therefore not passed.

A further attenuation response curve is plotted in a dash-line commencing with a steep rapidly falling portion 7, corresponding to the steep rising portion 3 of the curve 1—3, but disposed to the left of the predetermined frequency $f$. The curve 7 reaches the three-decibel attenuation mark at the predetermined frequency $f$, and then more gradually levels off, as shown at 5, to provide substantially uniform negligible attenuation of the order of about a quarter of a decibel, more or less, for all the frequencies shown above the predetermined frequency $f$. As an illustration, frequencies located within the high-frequency television band, known as the U. H. F. band, ranging from about 470 to about 890 megacycles, will be passed by such a system, with negligible substantially constant attenuation.

The present invention involves the use of a pair of untuned, non-resonant, broad-band-pass networks having responses substantially as respectively illustrated at 1—3 and 5—7, together passing all frequencies up to and beyond the predetermined frequency $f$ with substantially negligible uniform attenuation. While, in actual practice, the band-pass characteristic 1—3 can be achieved, negligibly attenuating all frequencies below the predetermined frequency $f$, limitations come into play at the very high radio frequencies, as before stated, at which the length of the circuit elements of the network system becomes an appreciable portion of the wavelength of these very high frequencies. This prevents the carrying out of the response curve 5—7 indefinitely to the right to infinite-valued frequencies. The portion 5 of the curve 5—7 may, however, be carried to the right over a very wide range of frequencies until the system commences to attenuate the very highest frequency signals.

By means of this untuned, non-resonant band-pass arrangement, the combined network system of the present invention is adapted to use with any desired relatively low- or relatively high-frequency bands and is thus not subject to the before-mentioned limitations of tuned resonant or anti-resonant filters that, by their very nature, can be used only for the particular narrow frequency bands to which they are resonant or anti-resonant. This enables the present invention, therefore, to be employed in a host of additional applications where such tuned filter devices may not be used.

Figure 1:
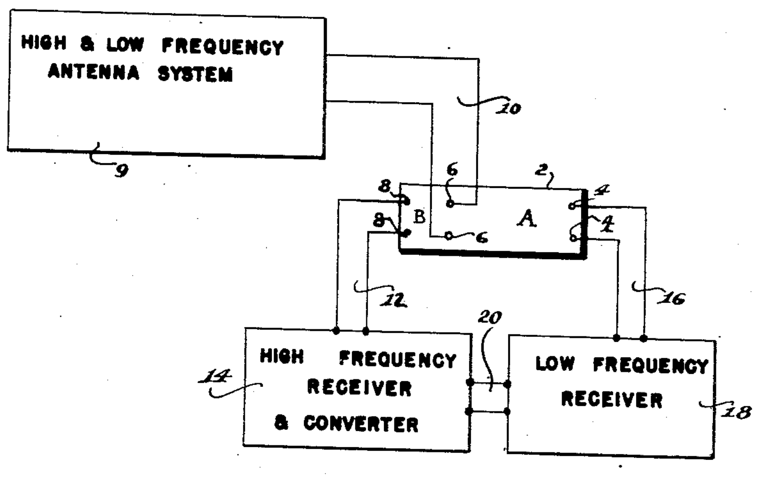

A first and preferred application of the present invention is schematically shown in Fig. 1. A network system 2 of the necessary character is provided with three pairs of spaced terminals 4—4, 6—6 and 8—8. Between the terminals 6—6 and 8—8 is provided a constant-K band-pass network, indicated generally at B, capable of producing a response such as is illustrated at 5—7 in Fig. 2. Between the terminals 4—4 and the common terminals 6—6 is disposed a similar constant-K band-pass network, indicated generally at A, adapted, however, to produce a response such as is shown at 1—3 in Fig. 2. Any high or low frequencies fed, for example, from a high- and low-frequency antenna system 9, or from any other desired source, lying within any of the wide band-pass regions from zero frequency up to the predetermined frequency $f$ and above the predetermined frequency $f$ as far as the response 5—7 may be carried with substantially negligible attenuation, may be fed to the common terminals 6—6 by, for example, a common transmission line 10 of the two-wire type.

The high-frequency terminals 8—8 of the network system 2 are fed by a further transmission line 12 to a high-frequency receiver 14. The low-frequency terminals 4—4 of the network system 2 are similarly fed by a further transmission line 16 to a low-frequency receiver 18. The high-frequency receiver 14 would normally appear to work into or from an impedance substantially matched thereto, namely the antenna or other system 9 as seen through transmission line 12, the high-frequency network B and the common transmission line 10. These high frequencies are thus fed into the receiver 14 from the antenna system or other source 9. At any of the high frequencies in the band-pass region 5—7 of the network B, however, the network A, on the other hand, between the terminals 6—6 and 4—4, in the absence of spurious resonance effects later described, will present a very high impedance, as illustrated by the rapidly rising portion 3 of the response curve 1—3. Even though the low-frequency receiver 18 is connected through the transmission line 16 and the low-frequency band-pass filter A to the terminals 6—6 and to the common transmission line 10, therefore, it can not receive the high frequencies in the band-pass region 5—7 of the high-frequency network B fed from the system 9. Similarly, the substantial impedance match between the low-frequency receiver 18 and the common transmission line 10, through the low-frequency network A, for frequencies lying within the band-pass region 1—3 of the low-frequency filter A, permits the low frequencies to reach the receiver 18. Even though the high-frequency receiver 14 is also connected through the high-frequency network B to the common terminals 6—6 of the common transmission line 10, since the network B presents a very high impedance to the low frequencies, attenuating the same with a high degree of attenuation, as shown by the steeply rising portion 7 of the response curve 5—7 of the network B, the low frequencies within the band-pass region 1—3 of the network A, fed from the system 9, will not reach the high-frequency receiver 14. Thus, the high-frequency receiver 14 and the low-frequency receiver 18 may receive their respective high- and low-frequencied signals from the high- and low-frequency antenna or other system 9 along the common transmission line 10 without any interaction or mutual effects between the two receivers. This result is obtained, moreover, for any of an infinite number of frequency bands both within the high-frequency band-pass region 5—7 and below the predetermined frequency *f* within the low-frequency band-pass region 1—3, unlike the before-mentioned tuned, resonant or anti-resonant filter devices of the prior art.

The antenna system 9, as an illustration, may comprise a combined very-high frequency (V. H. F.) television and ultra-high frequency (U. H. F.) television antenna system and the high-frequency receiver 14 may be tuned to any of the ultra-high frequencies. The low-frequency receiver 18, on the other hand, is tuned to any of the very-high frequencies. The receiver 14 may be provided with a converter, as is well known, to beat local oscillations with the received ultra-high frequencies, thus to reduce or to convert these received ultra-high frequencies into frequencies to which the low-frequency receiver 18 may be tuned. This is quite useful where it is not desired to have a complete receiver system for the ultra-high frequencies, but, on the contrary, it is desired to make use of the circuits of the low-frequency receiver 18 to act upon the signals received at the ultra-high frequencies. It is for this reason that the ultra-high frequency receiver and converter 14 is shown, in Fig. 1, connected by a further pair of conductors 20 to the low-frequency receiver 18. In actual practice, indeed, the network system 2 may be mounted directly upon the chassis of either the ultra-high-frequency receiver-and-converter 14 or the present-day television low-frequency receiver 18.

While the previous discussion has proceeded upon the assumption that the responses 1—3 and 5—7 overlap substantially in the region of the preferable three-decibel attenuation point at the predetermined frequency *f*, in actual practice, the curves may rise substantially parallel to each other just to the left and right of the predetermined frequency *f*, as shown at 3′ and 7′, respectively, in solid lines. There is thus provided a dead space in the region just to the left and to the right of the predetermined frequency *f*, to frequencies within which neither network of the network system 2 can respond. The solid-line responses 1—3′ and 5—7′ are, in practice, quite satisfactory for the above-mentioned application to the low-frequency V. H. F. television band and the high-frequency U. H. F. television band. These responses are also adapted, as before stated in connection with the responses 1–3 and 5–7, to receive any other desired frequencies below the portion of the dead space just to the left of the predetermined frequency *f*, and above the portion of the dead space just to the right of the predetermined frequency *f*.

The constant K-type high frequency and low-frequency untuned, non-resonant, band-pass networks B and A, are particularly advantageous for the purposes of the present invention. Such networks posssess the property that, sufficiently far from the high or low cut-off frequency of the network, as the case may be (substantially at the predetermined frequency *f* in the responses 1—3 and 5—7, and just below and above the frequency *f* in the respective responses 1—3′ and 1—7′), the networks behave as open circuits regardless of the impedance with which they are terminated. Sufficiently far from cut-off, to the left in the case of the responses 1—3 and 1—3′, and to the right in the case of the responses 5—7 and 5—7′, on the other hand, the networks may be designed to present the desired impedance match with the impedance with which they are terminated. These properties provide just what is required for the purposes of the present invention, as before explained.

Figure 3:
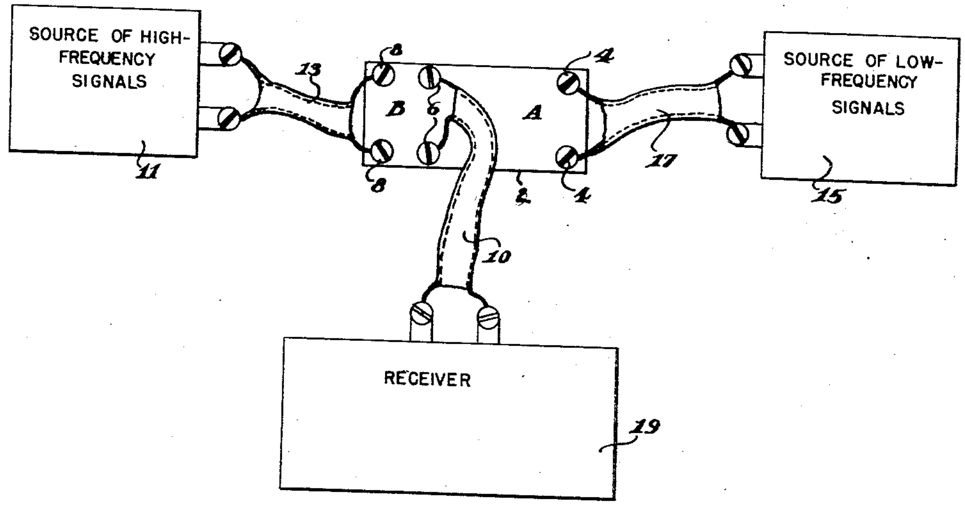
Figs. 3 and 4 are block diagrams of modified systems embodying such networks.

The present invention may also be utilized in systems of the character disclosed in Fig. 3 in which a source of high-frequency signals 11 is shown connected by, for example, a parallel-wire transmission-line section 13, to the terminals 8—8 of the high-frequency network B of the network system 2. A separate source of low-frequency signals 15 may be connected by a separate section of parallel-wire transmission line 17 to the terminals 4—4 of the low-frequency network A. The common terminals 6—6 are connected by a common transmission line 10 to a receiver 19 that may be adapted to receive either the high-frequency or the low-frequency signals, or selectively to receive both sets of signals. The sources of signals may be antennas, frequency generators, or any other desired sources, and the receiver 19 may similarly take any desired conventional form.

Figure 4:
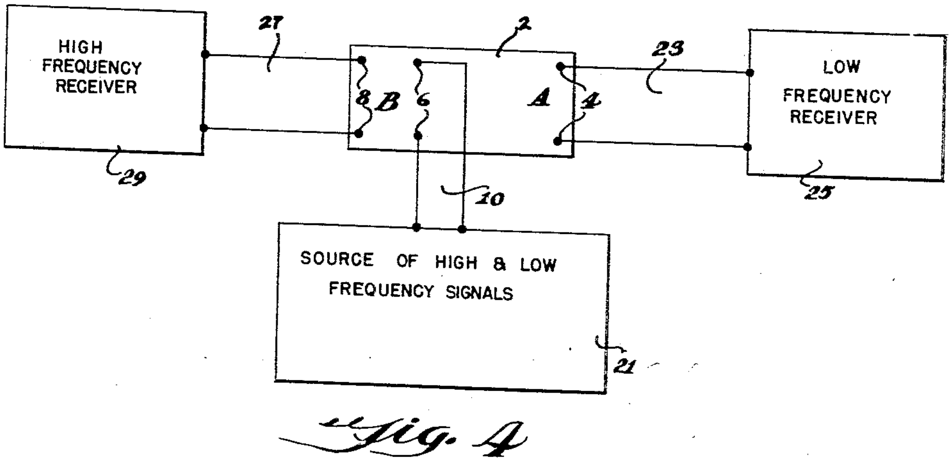

Another illustration of a system in which the network system 2 of the present invention may be utilized is shown in Fig. 4. High- and low-frequency signals from a source of high- and low-frequency signals 21 are there shown fed by conductors 10 to the common terminals 6. The terminals 4 are connected by conductors 23 to a low-frequency receiver 25, and the terminals 8 are connected by conductors 27 to a high-frequency receiver 29. As in the case of Fig. 1, there is no interaction or mutual effect between the high- or low-frequency paths in the systems of Figs. 3 and 4, and these systems are utilizable with any desired bands of low frequencies substantially up to the predetermined frequency *f* and any desired bands of frequencies substantially above the predetermined frequency *f*, limited only by the physical size of the components of the high-frequency network B.

It remains to explain how band-pass networks adapted to serve these purposes may be constructed. If constructed with regular lumped or distributed coils, condensers and other elements, certain difficulties inure since the system is relatively large and is sensitive to its environment, which influences the electrical values of the elements. Such conventional lumped elements, moreover, are subject to resonance effects as a result of the physical dimensions of these elements. For the television purposes, before mentioned, therefore, it has been found preferable, accordingly, to fabricate the band-pass networks of the present invention in the form of printed circuits.

Figure 5:
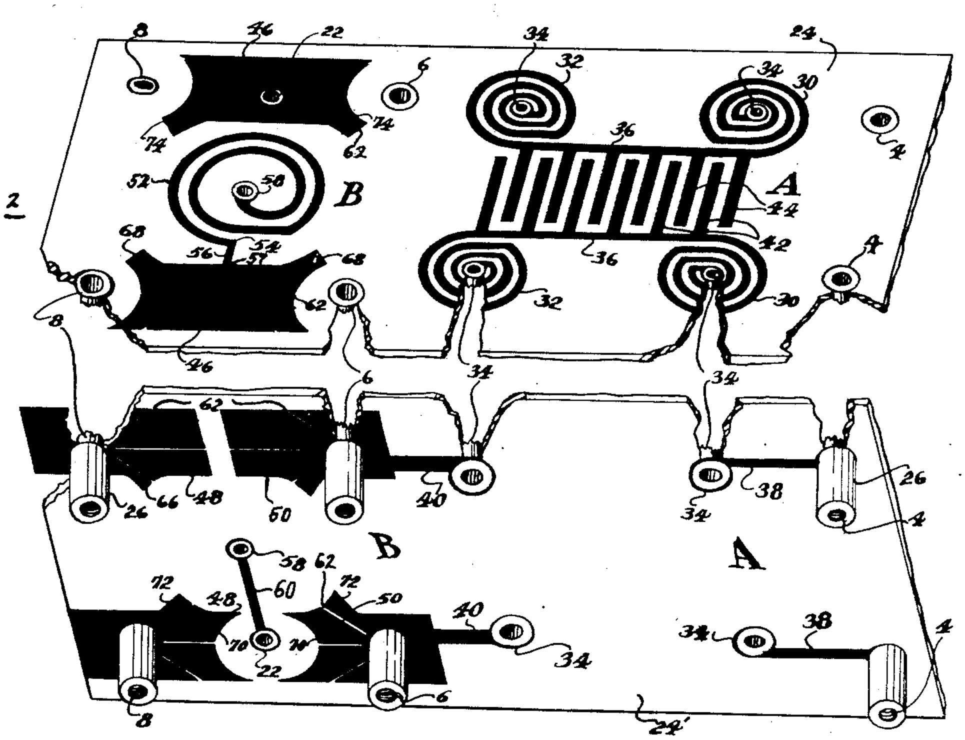
Fig. 5 is a perspective view of a printed-circuit network system constructed in accordance with a preferred embodiment of the present invention, the view being broken away in parts and expanded to make clear the details of construction.
Figure 6:
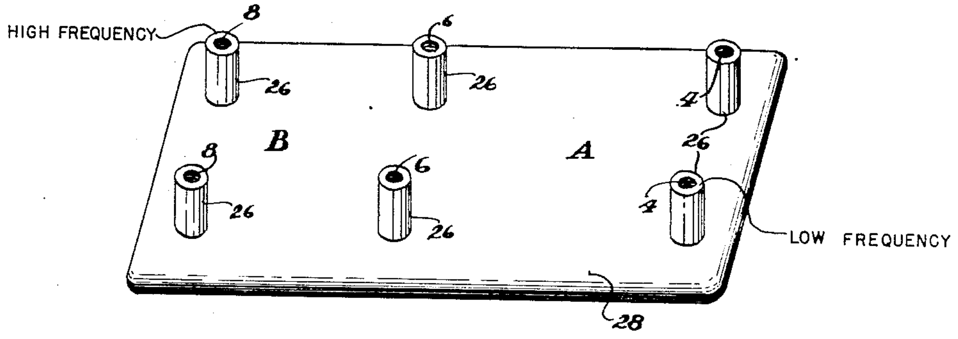
Fig. 6 is a perspective view of the network of Fig. 5 in a weatherproof casing.

It will conduce to clarity to described, first, the preferred printed-circuit form for the networks adapted to produce the desired responses illustrated in Fig. 2. In Fig. 5, the network system 2 comprises a dielectric planar support provided with an upper surface 24 and a lower surface 24', the support being illustrated as sliced in two and expanded for the purposes of explanation. In actual practice, the surface 24 may be the top of a thin planar dielectric plastic slab, and the surface 24', the bottom thereof. The terminals 4—4 may be eyelets passing from the top surface 24 through to the bottom surface 24' of the planar support. Similarly, the common terminals 6—6 and the terminals 8—8 may be of the same eyelet construction. Binding posts 26 covering the eyelets, may be utilized to permit easy connection to the printed-circuit network system 2, particularly when the system is provided with a weatherproof, preferably molded, plastic casing 28, Fig. 6.

The low-frequency, band-pass, untuned, nonresonant constant-K network A comprises two sets of series-connected inductance elements or coils 30—32 symmetrically disposed along opposite longitudinal edges of the upper surface 24 of the support. The coils are formed by printing or otherwise depositing spirals or multiloops originating with a central eyelet 34 and coiling outward therefrom. The series connection between each set of the coils 30 and 32 may comprise a printed, straight conductor 36. The printed conductors 36 are preferably disposed substantially parallel to the longitudinal edges of the support. The coils 30 are connected to the eyelet terminals 4—4 by further straight conductors 38 contributing some inductance, also, and printed upon the bottom surface 24' of the support and extending from the terminals 4—4 to the center eyelet connectors 34 of the coils 30. The portions of the eyelets 34 of the coils 32 that extend through the support to the bottom surface 24' thereof are similarly connected by printed conductors 40 to the common eyelet terminals 6—6. A capacitance element having at least a pair of capacitively cooperative conductors is preferably printed upon the upper surface 24 symmetrically between the series-connected sets of coils 30—32. This capacitance element is illustrated as of the form comprising two sets of interlaced parallel conductors 42 and 44 forming a plurality of pairs of capacitively cooperative conductors connected to and extending at substantially right angles from each of the straight conductors 36 connecting the inductance elements 30 and 32 of each set of series-connected inductance elements. This printed circuit network will be recognized as of the symmetrical double-T constant-K band-pass form.

The high-frequency network B is provided with a pair of sets of series-connected capacitors each comprising a first flat plate 46 printed upon the upper surface 24 of the support. A pair of separated or spaced further capacitor plates 48 and 50 are printed on the bottom surface 24', positioned such that the right-hand portion of the plate 48 and the left-hand portion of the plate 50 electrostatically cooperate through the support with the first plate 46 as a series-connected condenser arrangement. The plates 50 are intercepted at an intermediate point by, and extend beyond, the terminals 6—6, making contact with the before-mentioned conductors 40. The plates 48 are similarly intercepted by the eyelet terminals 8—8. There is thus connected between each terminal 8 and the corresponding terminal 6 a pair of series-connected capacitors comprising the capacitor formed by the right-hand portion of the plate 48 and the left-hand portion of the plate 46 in series with the capacitor formed by the right-hand portion of the plate 46 and the left-hand portion of the plate 50. Connected between the series-connected capacitors is an inductance element, shown as a coil 52 printed upon the upper surface 24. The outer terminal 54 of the coil 52 is connected by a short printed circuit conductor portion 56 to the inner edge 57 of the plate 46 closer to the viewer in Fig. 5. The inner end of the coil 52 is connected by an eyelet 58 that passes through to the bottom surface 24', and by a printed-circuit conductor 60, to an eyelet 22. The eyelet 22 passes through the support to the upper surface 24 and makes contact intermediate the other flat-plate capacitor element 46. The inductance element 52 is therefore connected between the series connections provided by the plates 46 for the capacitors 48—46 and 46—50, interconnecting each set of the terminals 6 and 8. This type of constant-K band-pass network is also of the double-T type, but utilizes capacitive series arms instead of the inductive series arms of the network A.

The elements of the networks A and B are adjusted to provide the desired responses respectively shown at 1—3 or 1—3', and 5—7 or 5—7', Fig. 2. Several limitations, however, have been found necessary in the construction of printed-circuit networks of this or similar character for this or similar purpose. In particular, it has been discovered that spurious resonances may be produced in the networks within the pass region or outside the same in the attenuation or rejection region that normally would not be expected. These spurious resonances result when the physical over-all length of, for example, the coils, corresponds to an appreciable fractional portion of the wavelength of the higher frequencies with which each of the networks is to operate, that is, the highest frequency applied to both networks. An investigation of the printed-circuit spiral coil of the character above-described, as an illustration, has shown that the reactance X of the coil is given approximately by the following relation:

$$X = 4 f_1 L_o \tan\left(\frac{\pi f}{2 f_1}\right)$$

where $L_o$ is the low-frequency inductance of the coil, $f$ is the frequency at which the coil is to be operated in a particular application, and $f_1$ is the first natural resonance frequency of the coil resulting from the physical over-all length of the coil corresponding to an appreciable fraction of a particular high-frequency wavelength within the band-pass of the particular network. This first natural resonant frequency $f_1$, moreover, has been found to be a function not only of the length of the conductor turns of the coil itself, but, also, of the spacing between the successive turns and of the dielectric material upon which the printed-circuit coil is formed.

It is preferable to utilize a phenolic-type dielectric support. With such supports of dielectric constant between about 3 and about 4, it has been found that the over-all length of the coils themselves should be equal to or less than about one-fifth the free-space wavelength of the highest frequency to be utilized with the particular network, that is, the highest frequency applied to the network. The first resonance $f_1$ has been found to occur at about one-fifth this wavelength value. To avoid such spurious resonance effects, therefore, printed-circuit inductance elements should be limited to an overall length, including the connections of the coils to the network terminals, such as the connections 38 and 40 and 56 and 60 in Fig. 5, to values substantially equal to or less than about one-fifth the wavelength of the highest frequency to be utilized in the particular network. The inductance of the coils in the high-frequency network B, for example, should not be greater than a few tenths of a microhenry, to accord with the above-mentioned criterion, and to avoid resonances below the 890-megacycle limit of the ultra-high-frequency band. It has been observed, moreover, that the spacing between the adjacent conductor turns of the inductance elements should correspond substantially to the width of the conductor material forming the turns. If dielectric supports are utilized having dielectric constants embracing a greater range, say, from the order of about 1 to about 5, the over-all length of each inductance element, including its connection to the network terminals, should be substantially equal to or less than from about one-half to about one-eighth the wavelength of the highest frequency to be utilized with the network.

Similar limitations apply to the capacitance elements. The spacing between the capacitor plates, the dielectric constant of the support therebetween, and the area of the capacitor plates, of course, determine the value of the capacitance. Each capacitor, however, has stray inductance and distributive capacitance with the other elements of the network. The stray inductance and distributive capacitance must be made negligible if the before-mentioned spurious resonance effects are not to be produced, and at the very least, the ratio of distributed capacitance to the distributed inductance of these capacitors must correspond substantially to that of the transmission line with which the networks are to be utilized. The same criterion is true in both the high-frequency network B and the low-frequency network A, except that, of course, a larger capacitance or inductance can be considered negligible in the case of the low-frequency network A. It has been determined that for the printed-circuit application of the present invention, the physical length of the capacitor plates, such as, for example, 46, 48 and 50, in Fig. 5, should preferably be substantially equal to or less than about one-tenth the wavelength of the highest frequency with which the network is to be utilized, in order to provide a negligible distributed inductance. Because the plates are so small, moreover, negligible distributive capacitance is produced with the other circuit elements of the network. The leads or connections such as 38, 40, 56, 60, etc. in Fig. 5 are preferably of the order of about a twentieth the wavelength of the highest frequencies. The dimensions of the inductors and capacitors before given, include these connections to the network terminals and other circuit elements.

The larger the area of the capacitor plates 46, 48 and 50, however, the greater the tendency for the printed plate to buckle or lift from the support as a result of a differential thermal expansion between the metal capacitor plate and the dielectric support. A copper capacitor plate area of less than about a tenth of a square inch, for example, will not tend to buckle or lift from a Bakelite support but larger areas may be required to produce the desired capacitance. This difficulty can be obviated by slitting the capacitor plates, preferably along diverging lines following the direction of current flow, but commencing with some intermediate region of the plate to maintain the segments formed by the slits in electrical connection with one another. The diverging slits 62 of the further plate 46 in Fig. 5 thus stop just short of the eyelet 22, and the slits 62 in the nearer plate 46 of Fig. 5, stop just short of the junction 57 with the conductor 56. The slits 62 of the plates 48 and 50 on the bottom surface 24' of the support similarly stop just short of the respective terminals 8 and 6, passed through intermediate portions of these plates. In this manner, the plates behave electrically as if they were continuous throughout, but even relatively large-area plates will not now easily buckle or otherwise loosen from the phenolic or other dielectric support.

The shape of the two sets of plates 48—50 upon the bottom surface 24' are slightly different since the lower set, as viewed in Fig. 5, must skirt the eyelet 22, while the upper set has no such restriction. Where the connection is made at 57 to the capacitor plate 46 closer to the viewer in Fig. 5, the oppositely disposed plates 48 and 50 are substantially rectangular, though they are provided with slight peaks 66 that cooperate with projections 68 in the upper flat plate 46 to provide the necessary amount of increased capacitance. The other plates 48—50, however, are curved at 70 to encircle the eyelet 22, and they are provided with projections 72 for producing further capacitance effects with the corresponding projections 74 of the corresponding upper plate 46.

Typical element dimensions necessary to give the particular response illustrated at 1—3' and 5—7' in Fig. 2 with, for example, a support 2 of the before-mentioned Bakelite, which plastic has a dielectric constant of the order of from about 3 to about 5, are as follows: For the network A, the length of the inductance elements 30 and 32 should be about 2.35 inches and the outer diameter thereof should be about 5/16 of an inch, each inductance element having the number of turns shown in Fig. 5. The straight conductor sections 36 should be about 3/4 of an inch long, and the length of the interlaced parallel conductors 42—44 should be about 5/16 of an inch with the spacing between the elements 42 and 44 and between the ends thereof and the oppositely disposed conductor 36 corresponding approximately to the width of the conductor elements themselves which should be about 1/32 of an inch. The length of the connection 38 should be about 3/8 of an inch, and the length of the connection 40, slightly less than about 3/8 of an inch. In the high-frequency network B, the approximate dimensions of the flat plate 46 should be an average of about 3/4 of an inch in length and about 1/4 of an inch in width. The elements 48 and 50 should similarly, on the average, be between about 1/4 and 1/2 of an inch long and about 1/4 of an inch in width and should be separated about 1/4 to 3/8 of an inch. The length of the coil 52 is preferably about 2.45 inches and its outer diameter about 7/16 of an inch, the coil having the number of turns illustrated in Fig. 5. The length of the respective connections 56 and 60 should be about 1/64 and 3/8 of an inch, respectively.

Expressed in other terms, since variations in printed-circuit element configurations may, as before explained, be achieved, for this V. H. F.-U. H. F. television application, the series inductance elements 30 and 32 preferably have a low-frequency inductance in the band-pass 1—3' of about 0.07 microhenries, and the capacitance of the elements 36—42—44 should be about 2.75 micromicrofarads. The inductance of the coil 52 of the network B at low frequencies in the band-pass 5—7' is preferably about 0.038 microhenries, while each of the capacitors 46—48 and 46—50 is about 2.00 micromicrofarads.

Modifications will occur to those skilled in the art and all such are considered to fall within the spirit and scope of the invention as defined in the appended claims.

What is claimed is:

1. A printed circuit network having input and output terminals and inductance and capacitance elements connected together between the terminals to cooperate as the impedance-determining elements of the network, the said elements being deposited upon a dielectric support of dielectric constant of the order of from about 3 to about 5, the length of each inductance element including connections to the network terminals being substantially equal to or less than about one-fifth the wavelength of the highest frequency to be utilized in the network, and each capacitance element having negligible stray inductance and distributed capacitance to the other elements of the network at the said wavelength.

2. A printed circuit network having input and output terminals and inductance and capacitance elements connected together between the terminals to cooperate as the impedance-determining elements of the network, the said elements being deposited upon a dielectric support of dielectric constant of the order of from about 3 to about 5, the length of each inductance element including connections to the network terminals being substantially equal to or less than about one-fifth the wavelength of the highest frequency to be utilized in the network with the spacing between adjacent conductor turns of the inductance element corresponding substantially to the width of the conductor turns, and each capacitance element having negligible stray inductance and distributed capacitance to the other elements of the network at the said wavelength.

3. A printed circuit network having input and output terminals and inductance and capacitance elements connected together between the terminals to cooperate as the impedance-determining elements of the network, the said elements being deposited upon a dielectric support of dielectric constant of the order of from about 3 to about 5, the length of each inductance element including connections to the network terminals being substantially equal to or less than about one-fifth the wavelength of the highest frequency to be utilized in the network with the spacing between adjacent conductor turns of the inductance element corresponding substantially to the width of the conductor turns, the length of the said connections to the network terminals being of the order of about one-twentieth the said wavelength, and the physical length of each capacitance element being equal to or less than about one-tenth the said wavelength.

4. An all-frequency untuned non-resonant printed-circuit network system comprising a pair of four-terminal constant K band-pass networks each having inductance and capacitance elements deposited upon a dielectric support of dielectric constant of the order of from about 3 to about 5 and with two terminals of each network common, the inductance and capacitance elements of one network between its other two terminals and the common terminals being adjusted to pass substantially all frequencies below a predetermined frequency with substantially uniform negligible attenuation and the inductance and capacitance elements of the other network between its other two terminals and the common terminals being adjusted to pass with substantially uniform negligible attenuation a very wide range of frequencies above the said predetermined frequency, the length of the inductance elements of each of the networks including their connections to the said terminals being substantially equal to or less than about one-fifth the wavelength of the highest frequency within the pass of both the networks, and the capacitance elements having negligible stray inductance and distributed capacitance to the other network elements at the said wavelength.

5. A printed circuit network system having a planar dielectric support of dielectric constant of the order of from about 3 to about 5 and three pairs of spaced terminals extending between the opposite plane surfaces of the support, a first untuned non-resonant constant K band-pass network connected between the first and second pair of terminals and a second untuned non-resonant constant K band-pass network connected between the second and third pair of terminals, the first network comprising two sets of series-connected inductance elements printed upon the support, one set connecting each terminal of the first pair of terminals with the corresponding terminal of the second pair of terminals, and a capacitance element printed upon the support and connected between the series connections of the inductance elements of each set of inductance elements, the values of the inductance and capacitance elements being adjusted to pass substantially all frequencies below a predetermined frequency with substantially uniform negligible attenuation, and the second network comprising two capacitance elements printed with opposing capacitance plates of each capacitance element upon the support, one capacitance element connecting each terminal of the second pair of terminals with the corresponding terminal of the third pair of terminals, and an inductance element printed upon the support and connected between corresponding plates of each of the capacitance elements, the values of the second network capacitance and inductance elements being adjusted to pass with substantially uniform negligible attenuation a very wide range of frequencies above the said predetermined frequency, the length of each inductance element of at least one network including the connections to the network terminals and to other network elements being substantially equal to or less than about one-fifth the wavelength of the highest frequency within the pass of both the networks, with the spacing between adjacent conductor turns of the inductance elements corresponding substantially to the width of the conductor turns, and the physical length of each capacitance element being equal to or less than about one tenth the said wavelength.

6. A printed circuit network having a planar dielectric support provided with three pairs of spaced terminals extending between the opposite plane surfaces of the support, a first untuned non-resonant constant K band-pass network connected between the first and second pair of terminals and a second untuned non-resonant constant K band-pass network connected between the second and third pair of terminals, the first network comprising two sets of spaced multi-loop inductance elements connected in series by a straight conductor printed upon the support, one set connecting each terminal of the first pair of terminals with the corresponding terminal of the second pair of terminals, and a capacitance element printed upon the support comprising at least a pair of capacitively cooperative conductors, one conductor of the pair extending at substantially right angles from each of the straight conductors connecting the inductance elements of each set of inductance elements, the values of the inductance and capacitance elements being adjusted to pass substantially all frequencies below a predetermined frequency with substantially uniform negligible attenuation, and the second network comprising two capacitance elements each comprising flat plates printed upon the support to be in capacitive opposition, one capacitance element connecting each terminal of the second pair of terminals with the corresponding terminal of the third pair of terminals, and a multi-loop inductance element printed upon the support and connected between corresponding plates of each of the capacitance elements, the values of the second network capacitance and inductance elements being adjusted to pass with substantially uniform negligible attenuation a very wide range of frequencies above the said predetermined frequency, the length of each inductance element of each network including connections to the network terminals and to other network elements being substantially equal to or less than substantially one-fifth the wavelength of the highest frequency within the pass of both the networks.

7. A printed circuit network system having a planar dielectric support provided with two pairs of spaced terminals and an untuned non-resonant constant K band-pass network connected between the pairs of terminals, the network comprising two sets of series-connected inductance elements printed upon the support, one set connecting each terminal of the first pair of terminals with the corresponding terminal of the second pair of terminals, the length of each inductance element including connections to the network terminals and to other network elements being substantially equal to or less than substantially one-fifth the wavelength of the highest frequency to be applied to the network, and a capacitance element printed upon the said support and connected between the series connections of the inductance elements of each set of inductance elements.

8. A printed circuit network system having a planar dielectric support provided with two pairs of spaced terminals and an untuned non-resonant constant K band-pass network connected between the pairs of terminals, the network comprising two sets of spaced multi-loop inductance elements connected in series by a straight conductor printed upon the support, one set connecting each terminal of the first pair of terminals with a corresponding terminal of the second pair of terminals, and a capacitance element printed upon the support comprising at least a pair of capacitively cooperative conductors, one conductor of the pair extending at substantially right angles from each of the straight conductors connecting the inductance elements of each set of inductance elements, the length of each inductance element including connections to the network terminals and to other network elements being substantially equal to or less than substantially one-fifth the wavelength of the highest frequency to be applied to the network.

9. A printed circuit-network system as claimed in claim 5 and in which the said predetermined frequency lies between the V. H. F. and U. H. F. television bands, and each of the first-named network inductance elements has a value of about 0.07 microhenries at low frequencies.

References Cited in the file of this patent

UNITED STATES PATENTS

| Number | Name | Date |
|---|---|---|
| 1,647,474 | Seymour | Nov. 1, 1927 |
| 2,041,098 | Whittle | May 19, 1936 |
| 2,076,248 | Norton | Apr. 6, 1937 |
| 2,096,031 | Cork | Oct. 19, 1937 |
| 2,227,384 | Wiessner | Dec. 31, 1940 |
| 2,474,988 | Sargrove | July 5, 1949 |
| 2,484,798 | Bradley | Oct. 11, 1949 |
| 2,611,010 | Sass et al. | Sept. 16, 1952 |

OTHER REFERENCES

Printed Circuit Techniques, National Bureau of Standards Circular 468 (copy may be obtained for 25 cents from U. S. Government Printing Office).